(12) United States Patent
Furukawa et al.

(10) Patent No.: US 8,885,274 B1
(45) Date of Patent: Nov. 11, 2014

(54) IMPLEMENTING SURFACE ANALYSIS TEST (SAT) FUNCTION FOR MICROWAVE-ASSISTED MAGNETIC RECORDING (MAMR) HDD WITH EMBEDDED CONTACT SENSOR (ECS) AND SPIN TORQUE OSCILLATOR (STO) SIGNALS

(71) Applicant: HGST Netherlands B.V., Amsterdam (NL)

(72) Inventors: Masaru Furukawa, Fujisawa (JP); Junguo Xu, Kasumigaura (JP); Jianhua Li, Sagamihara (JP); Makoto Satou, Hiratsuka (JP); Kenichiro Takahashi, Fujisawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/057,257

(22) Filed: Oct. 18, 2013

(51) Int. Cl.
*G11B 27/36* (2006.01)
(52) U.S. Cl.
USPC .......................................................... 360/31
(58) Field of Classification Search
None
See application file for complete search history.

(56) References Cited

U.S. PATENT DOCUMENTS

| | | | |
|---|---|---|---|
| 6,088,176 A | 7/2000 | Smith et al. | |
| 7,929,235 B2 | 4/2011 | Meier et al. | |
| 8,085,490 B2 | 12/2011 | Franca-Neto et al. | |
| 2013/0050865 A1* | 2/2013 | Katada et al. | 360/31 |

OTHER PUBLICATIONS

U.S. Appl. No. 13/495,903, filed Jun. 13, 2012, "Implementing Combined Phase and Amplitude Magnetic Defect Detection On-The-Fly" by Richard Leo Galbraith.

* cited by examiner

*Primary Examiner* — Daniell L Negron
(74) *Attorney, Agent, or Firm* — Joan Pennington

(57) ABSTRACT

A method, apparatus, and system are provided for implementing enhanced surface analysis test (SAT) function for microwave assisted magnetic recording (MAMR) hard disk drives (HDDs) using embedded contact sensor (ECS) and spin-torque oscillator (STO) signals. A preamplifier circuit receives the embedded contact sensor (ECS) and spin-torque oscillator (STO) signals and compares the received ECS and STO signals to identify magnetic disk media defects including bumps or thermal-asperity (TA) defects and pits or hole defects.

22 Claims, 9 Drawing Sheets

230

| | Normal area | Asperity 206 | Pit 208 |
|---|---|---|---|
| ECS SIGNAL 210 | —— | —∧⌄— | —∧⌄— |
| STO SIGNAL 212 | —— | —∧⌄— | —— |

FIG. 2C

IMPLEMENTING SURFACE ANALYSIS TEST (SAT) FUNCTION FOR MICROWAVE-ASSISTED MAGNETIC RECORDING (MAMR) HDD WITH EMBEDDED CONTACT SENSOR (ECS) AND SPIN TORQUE OSCILLATOR (STO) SIGNALS

FIELD OF THE INVENTION

The present invention relates generally to the data storage field, and more particularly, relates to a method, apparatus, and system for implementing enhanced surface analysis test (SAT) function for a microwave assisted magnetic recording (MAMR) hard disk drive (HDD) with embedded contact sensor (ECS) and spin-torque oscillator (STO) signals.

DESCRIPTION OF THE RELATED ART

In hard disk drives (HDDs) or a disk-drive system, read and write transducers reside in a slider which flies over a recording media or disk surface. The fly-height of the slider-to-disk has become smaller as storage densities continue to increase and fly-heights decrease. In recent years, in order to increase the recording density of an HDD, a technique to perform magnetic recording using a spin torque oscillator (STO) element incorporated in the slider has been developed.

With current HDDs, the gap between the slider and the disk is a few nanometers (nm). With such a minute gap, bumps or thermal-asperity (TA) on the disk and the STO element incorporated in the slider can easily come into contact. If the STO element comes into contact with bumps or thermal-asperity (TA) on the disk many times, the STO element is worn by friction, causing degradation of the STO element. This lowers the reliability of HDDs using STO elements.

Magnetic disk media defects including bumps or thermal-asperity (TA) defects and pits or hole defects limit the effective use of the magnetic disk media. Conventional surface analysis test (SAT) technology for detecting asperity or pit typically uses a contract detection element, such as embedded contact sensor (ECS) embedded in the read head of the HDD. In order to identify thermal-asperity (TA) defects and pit defects, it is necessary to perform two scans of the disk surface with different bias applied to the ECS.

A need exists for effective mechanism for implementing enhanced surface analysis test (SAT) function for microwave assisted magnetic recording (MAMR) HDDs. It is desirable to identify thermal-asperity (TA) defects and pit defects with a single scan of the disk surface, reducing the time required for the SAT.

SUMMARY OF THE INVENTION

Aspects of the preferred embodiments are to provide a method, apparatus, and system for implementing enhanced surface analysis test (SAT) function for microwave assisted magnetic recording (MAMR) for hard disk drives. Other important aspects of the preferred embodiments are to provide such method, apparatus, and system substantially without negative effect and to overcome some of the disadvantages of prior art arrangements.

In brief, a method, apparatus, and system are provided for implementing enhanced surface analysis test (SAT) function for microwave assisted magnetic recording (MAMR) hard disk drive (HDD) using embedded contact sensor (ECS) and spin-torque oscillator (STO) signals. A circuit receives the embedded contact sensor (ECS) and spin-torque oscillator (STO) signals and compares the received ECS and STO signals to identify magnetic disk media defects including thermal-asperity (TA) defects and pit defects with one scan of the disk surface.

BRIEF DESCRIPTION OF THE DRAWINGS

The present invention together with the above and other objects and advantages may best be understood from the following detailed description of the preferred embodiments of the invention illustrated in the drawings, wherein:

FIG. 2C is a chart illustrating example relationships between the embedded contact sensor (ECS) signal and the spin torque oscillator (STO) signal of FIG. 2A with a normal area, the thermal-asperity (TA) defect and pit defect in accordance with a preferred embodiment;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

In accordance with features of the preferred embodiments, a method, apparatus, and system are provided for implementing enhanced surface analysis test (SAT) function for microwave assisted magnetic recording (MAMR) for hard disk drives. A slider includes an embedded contact sensor (ECS) and a spin torque oscillator (STO) for identifying thermal-asperity (TA) defects and pit defects in accordance with a preferred embodiment. A preamplifier circuit receives the embedded contact sensor (ECS) and spin-torque oscillator (STO) signals and compares the received ECS and STO signals to identify magnetic disk media defects including bumps or thermal-asperity (TA) defects and pits or hole defects.

Figure 1:
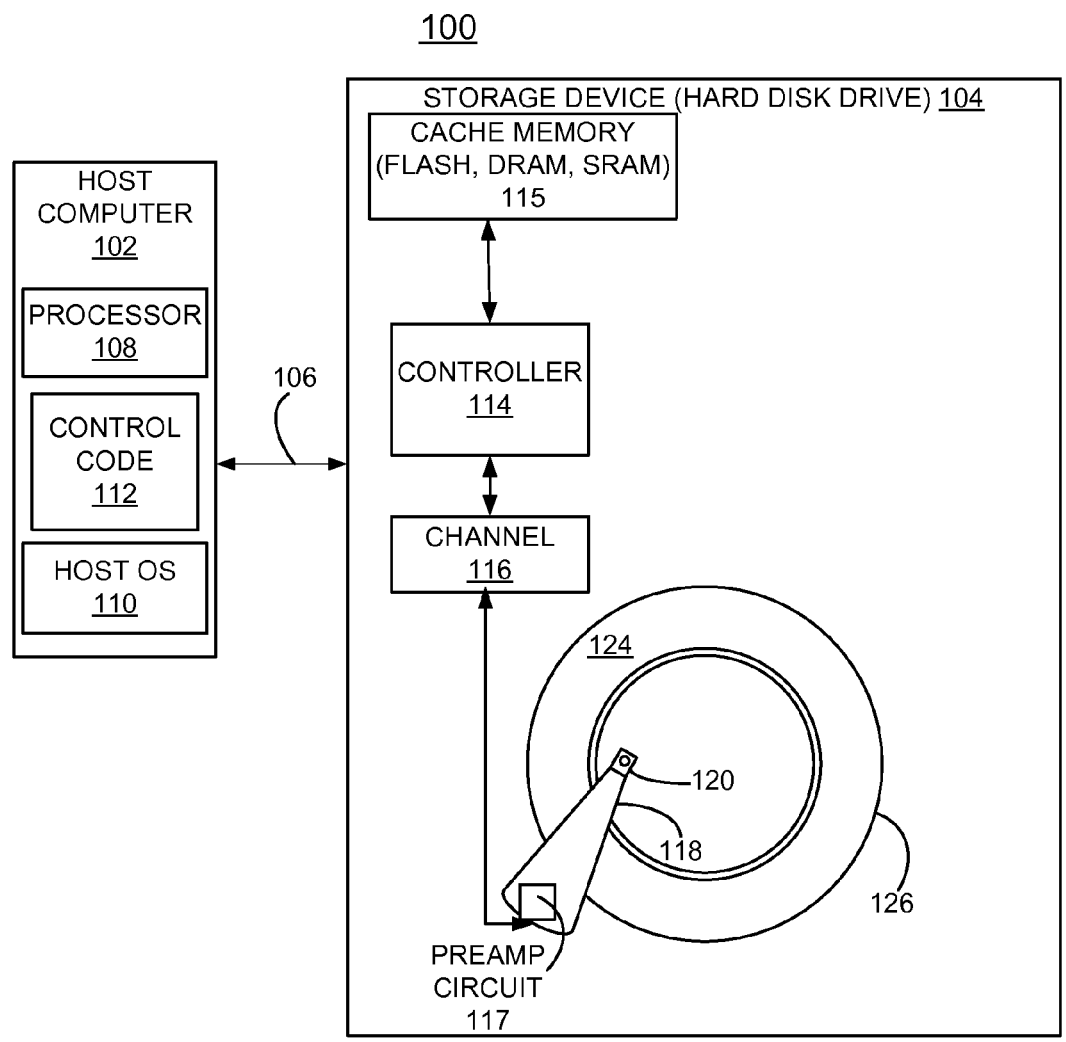
FIG. 1 is a schematic and block diagram representation illustrating an example system for implementing enhanced surface analysis test (SAT) function for microwave assisted magnetic recording (MAMR) for hard disk drives in accordance with a preferred embodiment.

Having reference now to the drawings, in FIG. 1, there is shown an example system generally designated by the reference character 100 for implementing enhanced surface analysis test (SAT) function for microwave assisted magnetic recording (MAMR) HDDs in accordance with an embodiment. System 100 includes a host computer 102, a storage device 104, such as a hard disk drive (HDD) 104, and an interface 106 between the host computer 102 and the storage device 104.

As shown in FIG. 1, host computer 102 includes a processor 108, a host operating system 110, and control code 112. The storage device or hard disk drive 104 includes a controller 114 coupled to a cache memory 115, for example, implemented with one or a combination of a flash memory, a dynamic random access memory (DRAM) and a static random access memory (SRAM), and coupled to a data channel 116.

The storage device or hard disk drive 104 includes a preamplifier (preamp) circuit 117 for implementing enhanced surface analysis test (SAT) function in accordance with a preferred embodiment. The storage device or hard disk drive 104 includes an arm 118 carrying a novel slider 120 for implementing a spin torque oscillator (STO) and an embedded contact sensor (ECS) in accordance with an embodiment of the invention. Slider 120 contains an embedded contact sensor (ECS) and a spin torque oscillator (STO) in accordance with a preferred embodiment. The slider 120 flies over a writable disk surface 124 of a disk 126.

Figure 2A:
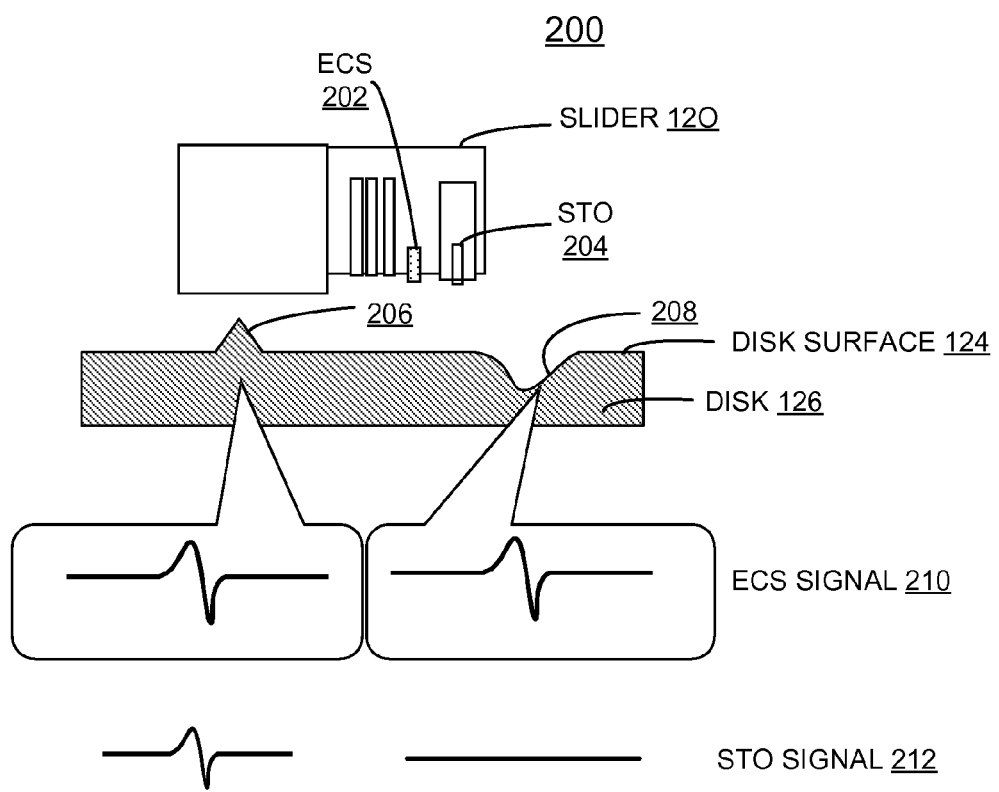
FIG. 2A illustrates an example slider element arrangement together with a disk including a thermal-asperity (TA) defect and a pit defect and the slider having an embedded contact sensor (ECS), a spin torque oscillator (STO) and a heater element which is usually called as "TFC heater" in accordance with a preferred embodiment.

Referring now to FIG. 2A, there is shown an example slider apparatus generally designated by the reference character 200, for example, implementing slider 120 that flies the disk media or disk surface 124 of the disk 126 in accordance with preferred embodiments. Slider apparatus 200 includes an embedded contact sensor (ECS) 202 and a spin torque oscillator (STO) 204 provided with the slider 120.

As shown in FIG. 2A, the slider 120 is levitated above the disk surface 124 with the ECS 202 and the STO 204 facing the rotating disk 126. The disk surface 124 includes a thermal-asperity (TA) defect 206 and a pit defect 208. An ECS signal 210 and an STO signal 212 are shown below the disk 126 in FIG. 2A.

Figure 2B:
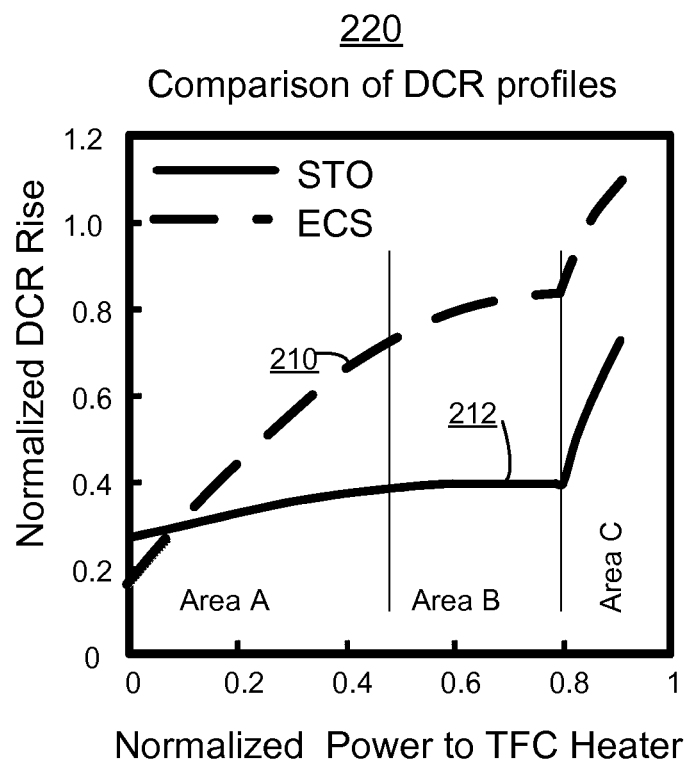
FIG. 2B illustrates example DC resistance profiles for the embedded contact sensor (ECS) and spin torque oscillator (STO) of FIG. 2A as a function of applied power to the TFC heater under the slider flying condition on the disk in accordance with a preferred embodiment.

Referring to FIG. 2B, there is shown example DC resistance profiles for the embedded contact sensor (ECS) 202 and spin torque oscillator (STO) 204 generally designated by the reference character 220 as a function of the applied power to the TFC heater in accordance with a preferred embodiment. In FIG. 2B, the normalized DCR (DC resistance) rise is shown relative to the vertical axis and the normalized applied power to the TFC heater is shown relative to the horizontal axis. The STO signal 212 is shown in solid line and the ECS signal 210 is shown in dotted line. DCR rise is caused by the temperature change of ECS or STO elements due to the heating of TFC heater, the self heating of ECS or STO elements, the heating of environmental temperature and the heat transfer from the slider to the disk. As shown, the ECS signal 210 increases by the effect of the heating of TFC heater indicated at the area A. Then, the slope of the ECS signal 210 reduces by the heat transfer indicated at the area B. Finally, the ECS signal 210 greatly increases by the friction heating due to the slider and disk contact indicated at the area C. On the other hand, the STO signal 212 slightly increases by the low effect of the heating of TFC heater at the area A. Then, the slope of the STO signal 212 reduces by the heat transfer at the area B. Finally, the STO signal 212 greatly increases by the friction heating due to the slider and disk contact at the area C.

Referring to FIG. 2C, there is shown an example chart generally designated by the reference character 230 illustrating example relationships between the embedded contact sensor (ECS) signal 210 and the spin torque oscillator (STO) signal 212 with a normal area, the thermal-asperity (TA) defect 206 and pit defect 208 in accordance with a preferred embodiment. In case of Normal area, ECS signal 210 and STO signal 212 become flat. In case of thermal-asperity (TA) defect 206, ECS signal 210 and STO signal 212 increase because the sensor temperature rises by the friction heating due to the slider and disk contact. In case of pit defect 208, ECS signal 210 increases because the spacing between the slider and the disk bottom increases due to the pit, then the heat transfer reduces. On the other hand, STO signal 212 becomes flat because the heating of TFC heater was small, then the effect of heat transfer change is also small.

Figure 3:
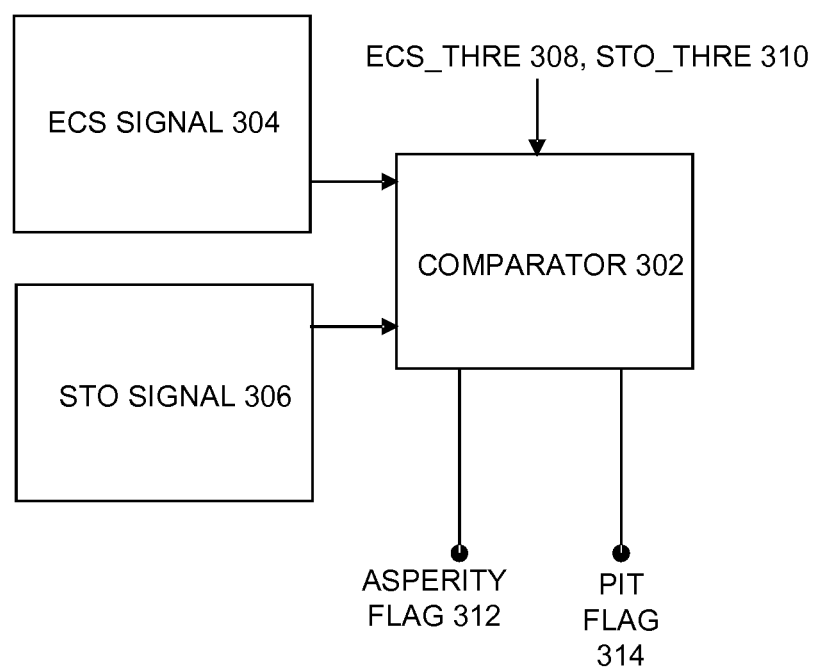
FIG. 3 illustrates an example circuit for implementing enhanced surface analysis test (SAT) function for microwave assisted magnetic recording (MAMR) for hard disk drives in accordance with a preferred embodiment.

Referring also to FIG. 3, there is shown an example preamplifier circuit generally designated by the reference character 300 for implementing enhanced surface analysis test (SAT) function for microwave assisted magnetic recording (MAMR) for hard disk drives in accordance with a preferred embodiment. The preamplifier circuit 300 includes a comparator 302 receiving an ECS signal 304 and an STO signal 306, for example, from the embedded contact sensor (ECS) 202 and the spin torque oscillator (STO) 204 provided with the slider 120 as shown in FIG. 2A. The ECS signal 304 is taken as values, such as ECS voltage value, ECS current value, Peak hold value, RMS (root mean square) value, DCR (DC resistance) value, and count value. The STO signal 306 is taken as values, such as STO voltage value, STO current value, Peak hold value, RMS (root mean square) value, DCR (DC resistance) value, and count value.

The ECS signal 304 and STO signal 306 are compared with a respective threshold value, ECS_THRE 308 and STO_THRE 310. The comparator 302 provides an asperity flag 312 and a pit flag 314 responsive to the compared values respectively detecting a thermal asperity defect and a pit defect, as illustrated in the chart 230 in FIG. 2C, and as illustrated and described with respect to FIG. 4.

Figure 4:
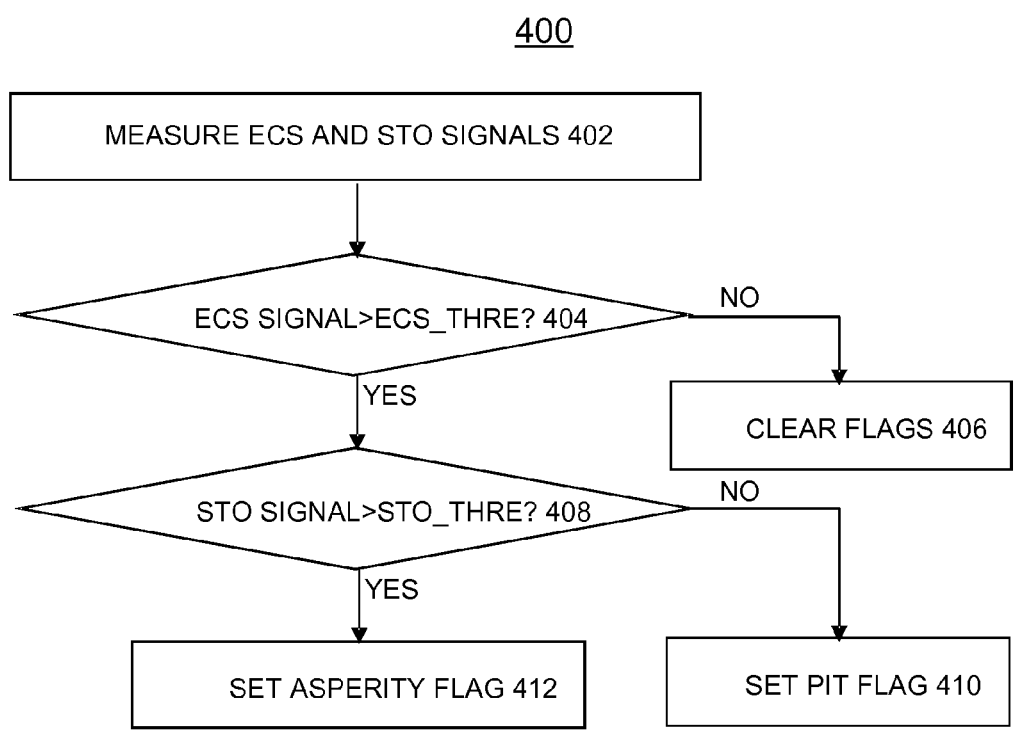
FIG. 4 is a flowchart illustrating operations of the comparator of the circuit of FIG. 3 for implementing enhanced surface analysis test (SAT) function for microwave assisted magnetic recording (MAMR) for hard disk drives in accordance with a preferred embodiment.

Referring also to FIG. 4, there are shown example operations generally designated by the reference character 400 of the comparator 302 of the circuit 300 for implementing enhanced surface analysis test (SAT) function for microwave assisted magnetic recording (MAMR) for hard disk drives in accordance with a preferred embodiment. As indicated in a block 402, ECS and STO signals are measured. The measured ECS signal is compared with a predefined threshold value ECS_THRE as indicated in a decision block 404. When the measured ECS signal is less than or equal to the predefined threshold value ECS_THRE, then the flags, asperity flag 312 and the pit flag 314 are cleared.

When the measured ECS signal is greater than the predefined threshold value ECS_THRE, then the measured STO signal is compared with a predefined threshold value STO- _THRE as indicated in a decision block 408. When the measured STO signal is less than or equal to the predefined threshold value STO_THRE, then the pit flag 314 is set as indicated in a block 410. When the measured STO signal is greater than the predefined threshold value STO_THRE, then the asperity flag 312 is set as indicated in a block 412.

Figure 5:
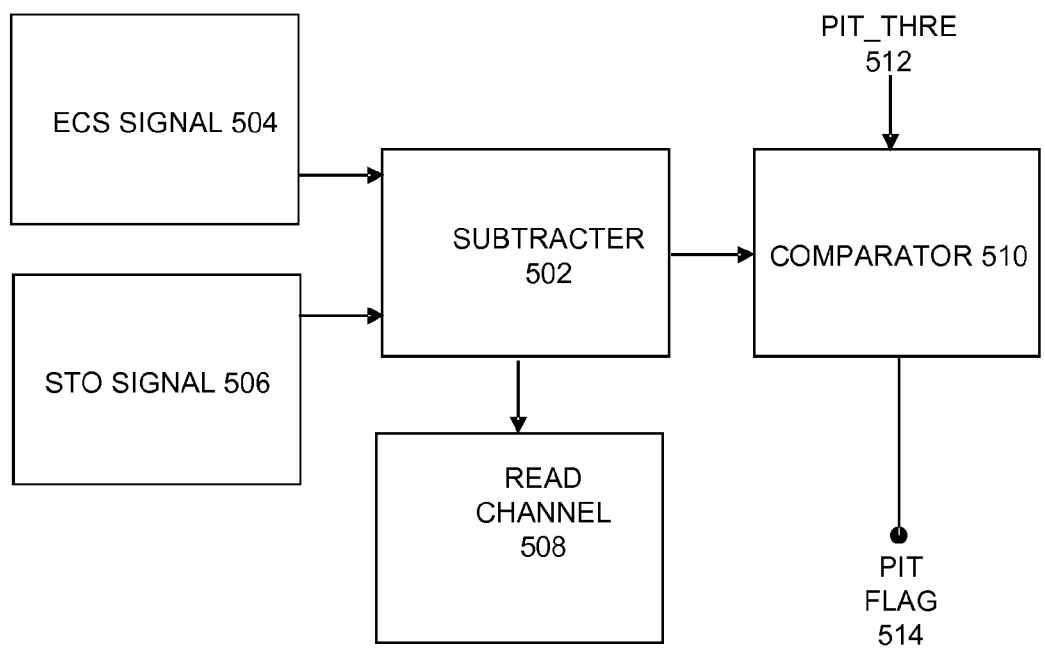
FIG. 5 illustrates another example circuit for implementing enhanced surface analysis test (SAT) function for microwave assisted magnetic recording (MAMR) for hard disk drives in accordance with a preferred embodiment.

Referring now to FIG. 5, there is shown another example circuit generally designated by the reference character 500 for implementing enhanced surface analysis test (SAT) function for microwave assisted magnetic recording (MAMR) for hard disk drives in accordance with a preferred embodiment. Circuit 500 is effective for detecting a pit defect in accordance with a preferred embodiment.

The preamplifier circuit 500 includes a subtracter 502 receiving an ECS signal 504 and an STO signal 506, for example, from the embedded contact sensor (ECS) 202 and the spin torque oscillator (STO) 204 provided with the slider 120 as shown in FIG. 2A. The ECS signal 504 is taken as values, such as ECS voltage value, ECS current value, Peak hold value, RMS (root mean square) value, DCR (DC resistance) value, and count value. The STO signal 506 is taken as values, such as STO voltage value, STO current value, Peak hold value, RMS (root mean square) value, DCR (DC resistance) value, and count value. The subtracter 502 applies a signal to a read channel 508 and applies a signal to a comparator 510.

The output signal of subtracter 502, which is the subtracted ECS signal 304 and STO signal 306, applied to comparator 510 is compared with a threshold value, PIT_THRE 512. The comparator 510 provides a pit flag 514 responsive to the compared values respectively detecting a pit defect, such as the pit defect 208 as illustrated in FIG. 2A.

Figure 6A:
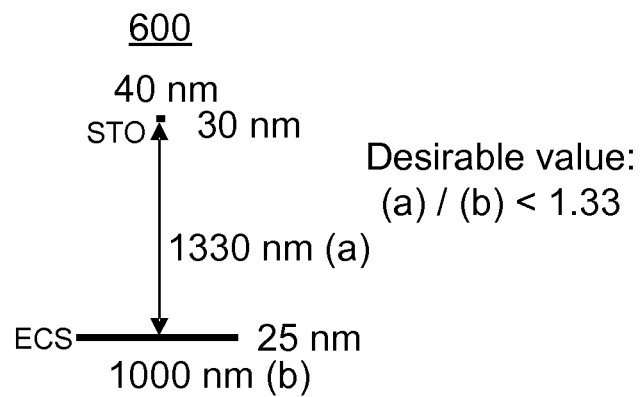
FIGS. 6A, 6B and 6C illustrate suitable arrangements of slider elements including the embedded contact sensor (ECS) and spin torque oscillator (STO) of FIG. 2A for identifying thermal-asperity (TA) defects and pit defects in accordance with a preferred embodiment.
Figure 6B:
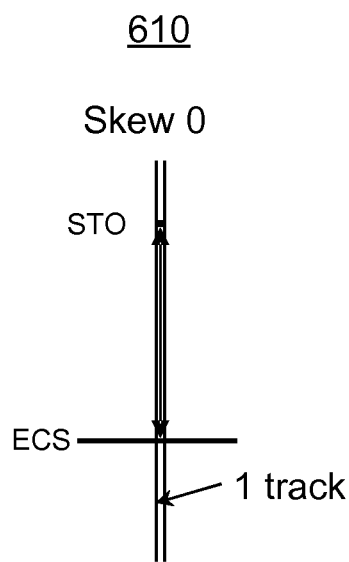
Figure 6C:
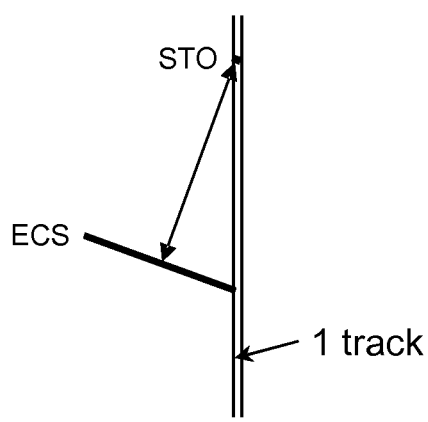

FIGS. 6A, 6B and 6C illustrate suitable arrangements of slider elements including the embedded contact sensor (ECS) and spin torque oscillator (STO) of FIG. 2A for identifying thermal-asperity (TA) defects and pit defects in accordance with a preferred embodiment.

In FIG. 6A, an arrangement of slider elements including the embedded contact sensor (ECS) and spin torque oscillator (STO) is generally designated by the reference character 600. As shown, the slider element arrangement 600 of ECS and STO includes a vertical dimension (a) of 1330 nm and a horizontal dimension (b) of 1000 nm, where (a)/(b) is less than 1.33 for a desirable value.

In FIG. 6B, an arrangement of slider elements including the embedded contact sensor (ECS) and spin torque oscillator (STO) is generally designated by the reference character 610. As shown, the slider element arrangement 610 of ECS and STO includes a skew of 0 degrees with one track shown.

In FIG. 6C, an arrangement of slider elements including the embedded contact sensor (ECS) and spin torque oscillator (STO) is generally designated by the reference character 620. As shown, the slider element arrangement 620 of ECS and STO includes a skew of 20 degrees with one track shown for a maximum skew condition.

While the present invention has been described with reference to the details of the embodiments of the invention shown in the drawing, these details are not intended to limit the scope of the invention as claimed in the appended claims.

What is claimed is:

1. A method for implementing enhanced surface analysis test (SAT) function for microwave assisted magnetic recording (MAMR) hard disk drives (HDDs) comprising:
providing an embedded contact sensor (ECS) and a spin-torque oscillator (STO) sensor;
simultaneously measuring an ECS signal and a STO signal in a single scan of a disk surface; and
comparing the measured ECS and STO signals to identify magnetic disk media defects including thermal-asperity (TA) defects and hole defects.

2. The method as recited in claim 1 includes providing a preamplifier circuit for receiving the measured ECS and STO signals to identify magnetic disk media defects.

3. The method as recited in claim 2 wherein providing said preamplifier circuit includes providing said preamplifier circuit with a comparator for comparing the measured ECS and STO signals to identify magnetic disk media defects.

4. The method as recited in claim 3 wherein said comparator compares the measured ECS with a first threshold value to identify a magnetic disk media defect including one of a thermal-asperity (TA) defect or a hole defect.

5. The method as recited in claim 4 includes said comparator identifies the measured STO signal greater than said first threshold value to identify said magnetic disk media defect.

6. The method as recited in claim 4 includes said comparator responsive to identifying said magnetic disk media defect, compares the measured STO signal with a second threshold value to identify one of a thermal-asperity (TA) defect or a hole defect for said identified magnetic disk media defect.

7. The method as recited in claim 6 wherein said comparator identifies the measured STO signal greater than said second threshold value to identify said thermal-asperity (TA) defect for said identified magnetic disk media defect.

8. The method as recited in claim 6 wherein said comparator identifies the measured STO signal less than or equal to said second threshold value to identify said hole defect for said identified magnetic disk media defect.

9. The method as recited in claim 1 wherein providing an embedded contact sensor (ECS) and a spin-torque oscillator (STO) sensor includes providing a slider including said embedded contact sensor (ECS) and said spin-torque oscillator (STO) sensor.

10. The method as recited in claim 1 wherein providing said slider including a selected arrangement including a maximum skew angle of said embedded contact sensor (ECS) and said spin-torque oscillator (STO) sensor.

11. An apparatus for implementing enhanced surface analysis test (SAT) function for microwave assisted magnetic recording (MAMR) hard disk drives (HDDs) comprising:
an embedded contact sensor (ECS) and a spin-torque oscillator (STO) sensor; said ECS and STO sensor simultaneously measuring an ECS signal and a STO signal; and
a preamplifier circuit receiving and comparing the measured ECS and STO signals to identify magnetic disk media defects including thermal-asperity (TA) defects and hole defects in a single scan of a disk surface.

12. The apparatus as recited in claim 11 wherein said preamplifier circuit includes a comparator for receiving and comparing the measured ECS and STO signals to identify magnetic disk media defects.

13. The apparatus as recited in claim 12 wherein said comparator compares the measured ECS with a first threshold value to identify a magnetic disk media defect including one of a thermal-asperity (TA) defect or a hole defect.

14. The apparatus as recited in claim 13 wherein said comparator identifies the measured STO signal greater than said first threshold value to identify said magnetic disk media defect.

15. The apparatus as recited in claim 13 wherein said comparator responsive to identifying said magnetic disk media defect, compares the measured STO signal with a second threshold value to identify one of a thermal-asperity (TA) defect or a hole defect for said identified magnetic disk media defect.

16. The apparatus as recited in claim 15 wherein said comparator identifies the measured STO signal greater than said second threshold value to identify said thermal-asperity (TA) defect for said identified magnetic disk media defect.

17. The apparatus as recited in claim 15 wherein said comparator identifies the measured STO signal less than or equal to said second threshold value to identify said hole defect for said identified magnetic disk media defect.

18. The apparatus as recited in claim 15 wherein said slider includes a predefined arrangement of said embedded contact sensor (ECS) and said spin-torque oscillator (STO) sensor including a predefined ratio represented by (a)/(b) of a vertical dimension (a) and a horizontal dimension (b), where said predefined ratio (a)/(b) is less than 1.33.

19. A system for implementing enhanced surface analysis test (SAT) function for microwave assisted magnetic recording (MAMR) hard disk drives (HDDs) comprising:

at least one disk for storing data;

a slider including an embedded contact sensor (ECS) and a spin-torque oscillator (STO) sensor; said ECS and STO sensor simultaneously measuring an ECS signal and a STO signal; and a preamplifier circuit receiving and comparing the measured ECS and STO signals to identify magnetic disk media defects including thermal-asperity (TA) defects and hole defects in a single scan of a disk surface.

20. The system as recited in claim 19 wherein said preamplifier circuit includes a comparator for receiving and comparing the measured ECS and STO signals to identify magnetic disk media defects.

21. The system as recited in claim 19 wherein said slider includes a predefined arrangement including a maximum skew angle of said embedded contact sensor (ECS) and said spin-torque oscillator (STO) sensor.

22. The system as recited in claim 19 wherein said slider includes a predefined arrangement of said embedded contact sensor (ECS) and said spin-torque oscillator (STO) sensor including a predefined ratio represented by (a)/(b) of a vertical dimension (a) and a horizontal dimension (b), where said predefined ratio (a)/(b) is less than 1.33.

* * * * *